US010233516B2

(12) United States Patent
Miyamoto et al.

(10) Patent No.: US 10,233,516 B2
(45) Date of Patent: *Mar. 19, 2019

(54) METHOD FOR RECOVERING HEAVY RARE EARTH ELEMENT

(71) Applicant: HITACHI METALS, LTD., Tokyo (JP)

(72) Inventors: Yu Miyamoto, Mishima-gun (JP); Hiroyuki Hoshi, Mishima-gun (JP); Atsushi Kikugawa, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 580 days.

This patent is subject to a terminal disclaimer.

(21) Appl. No.: 14/763,340

(22) PCT Filed: Jan. 27, 2014

(86) PCT No.: PCT/JP2014/051696
§ 371 (c)(1),
(2) Date: Jul. 24, 2015

(87) PCT Pub. No.: WO2014/115876
PCT Pub. Date: Jul. 31, 2014

(65) Prior Publication Data
US 2015/0361526 A1    Dec. 17, 2015

(30) Foreign Application Priority Data

Jan. 28, 2013 (JP) ................................. 2013-013571
Jan. 28, 2013 (JP) ................................. 2013-013577

(51) Int. Cl.
C22B 59/00    (2006.01)
C22B 1/02    (2006.01)
(Continued)

(52) U.S. Cl.
CPC .............. *C22B 59/00* (2013.01); *C22B 1/005* (2013.01); *C22B 1/02* (2013.01); *C22B 1/16* (2013.01); *C22B 7/001* (2013.01); *Y02P 10/214* (2015.11)

(58) Field of Classification Search
CPC .............. C22B 59/00; C22B 1/02; C22B 1/16
See application file for complete search history.

(56) References Cited

FOREIGN PATENT DOCUMENTS

CN    102011020 A    4/2011
EP    2940163 A1    11/2015
(Continued)

OTHER PUBLICATIONS

First Office Action dated Aug. 31, 2016 in the corresponding Chinese patent application No. 201480006284.3.
(Continued)

*Primary Examiner* — Melissa S Swain
(74) *Attorney, Agent, or Firm* — Kratz, Quintos & Hanson, LLP

(57) ABSTRACT

An object of the present invention is to provide a method for recovering a heavy rare earth element from a workpiece containing at least a heavy rare earth element and an iron group element, which can be put into practical use as a low-cost, simple recycling system. The method for recovering a heavy rare earth element from a workpiece containing at least a heavy rare earth element and an iron group element of the present invention as a means for resolution is characterized by including at least the following step: a workpiece is subjected to an oxidation treatment or mixed with an oxidation-treated R—Fe—B based magnet alloy, and then subjected to a heat treatment in the presence of carbon at a temperature of 1000° C. or more, thereby separating a heavy rare earth element in the form of an oxide from an iron group element.

8 Claims, 2 Drawing Sheets

(51) Int. Cl.
*C22B 1/16* (2006.01)
*C22B 1/00* (2006.01)
*C22B 7/00* (2006.01)

(56) References Cited

FOREIGN PATENT DOCUMENTS

| | | | |
|---|---|---|---|
| JP | 05170534 A | * | 7/1993 |
| JP | 2011501635 | * | 1/2011 |
| JP | 2012-41588 A1 | | 3/2012 |
| WO | WO 2010/098381 A1 | | 9/2010 |
| WO | WO 2012/008426 A1 | | 1/2012 |
| WO | WO 2013/018710 A1 | | 2/2013 |

OTHER PUBLICATIONS

Extended European Search Report dated Sep. 15, 2016 in the corresponding European patent application No. 14743491.4.
M. Nakamoto, et al.; "Extraction of Rare Earth Elements as Oxides from a Neodymium Magnetic Sludge;" Metallurgical and Materials Transactions B; vol. 43; Jun. 2012; pp. 468-476 (9 Sheets)/Cited in International Search Report.
International Search Report for International Application No. PCT/JP2014/051696 dated May 13, 2014.
Related co-pending U.S. Appl. No. 14/234,750, filed Jan. 24, 2014.

* cited by examiner

[Fig. 1]
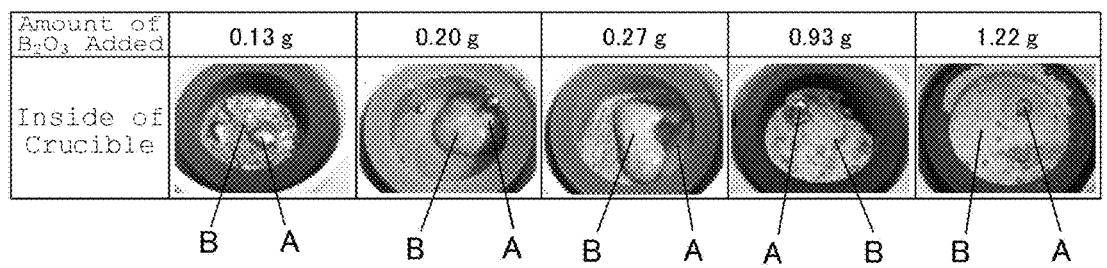
[Fig. 2]
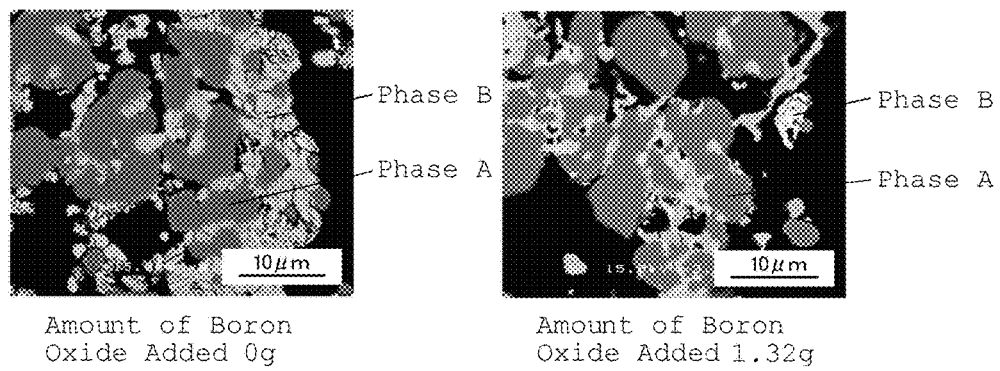
[Fig. 3]
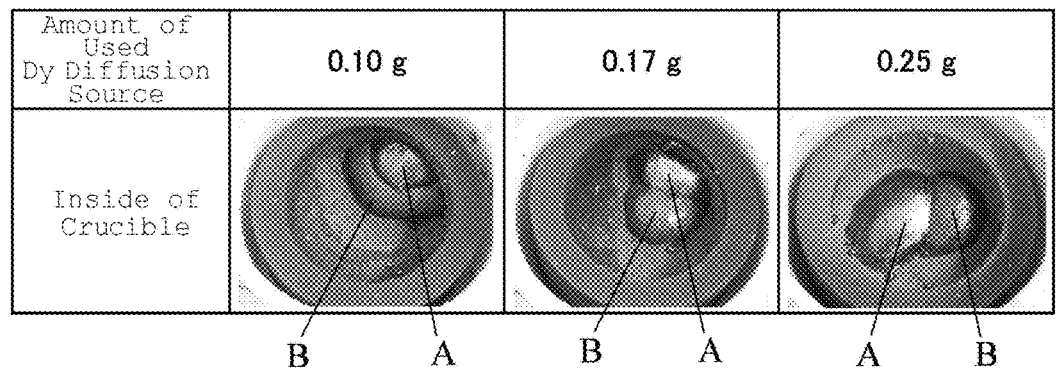

[Fig. 4]
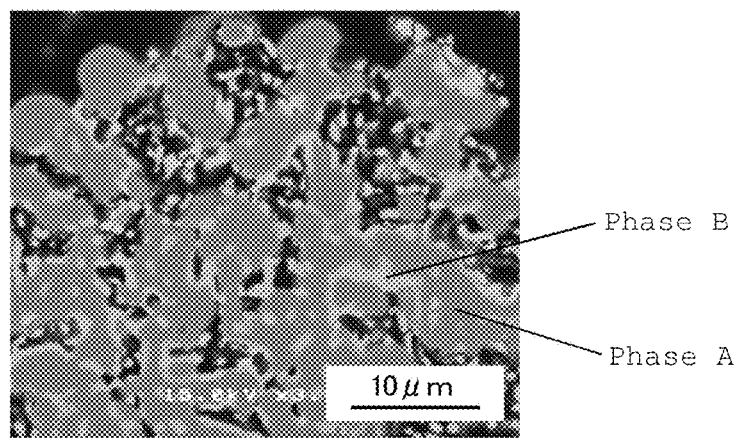

METHOD FOR RECOVERING HEAVY RARE EARTH ELEMENT

TECHNICAL FIELD

The prevent invention relates to a method for recovering a heavy rare earth element from a workpiece containing at least a heavy rare earth element and an iron group element, such as a used heavy rare earth element diffusion source made of an alloy of a heavy rare earth element and iron, which is used to diffuse a heavy rare earth element into an R—Fe—B based permanent magnet (R is a rare earth element) to improve the coercive force.

BACKGROUND ART

R—Fe—B based permanent magnets have high magnetic characteristics and thus are used in various industrial products, including motors for electric power steerings, engine motors of hybrid electric vehicles or electric vehicles, motors for air-conditioners, magnetic head actuators for hard disk drives, and the like. However, they have the property that their coercive force decreases at high temperatures. Accordingly, R—Fe—B based permanent magnets to be incorporated into motors for use in vehicles, etc., are required to have particularly high coercive force so that predetermined coercive force can be maintained even after exposure to high temperatures in severe use environments. Under such circumstances, attempts have been made to improve the coercive force of R—Fe—B based permanent magnets. As a method therefor, a method in which a heavy rare earth element, such as Dy or Tb, is added to a raw material alloy for R—Fe—B based permanent magnets is known. This method is advantageous as a method for improving the coercive force of R—Fe—B based permanent magnets, but in some cases, the heavy rare earth element is added to a content near 10 mass % in the magnet. However, heavy rare earth elements are scarce resources, and our country is dependent on imports from China. Therefore, there is urgent need of reducing use of heavy rare earth elements as much as possible. Thus, as a method for achieving the efficient improvement of the coercive force of an R—Fe—B based permanent magnet with reduced use of heavy rare earth elements, a method in which a heavy rare earth element is diffused from the surface into the inside of an R—Fe—B based permanent magnet has been attracting attention. For example, Patent Document 1 proposes a method in which a magnet and a diffusion source made of an alloy of a heavy rare earth element and iron (e.g., an alloy piece made of $DyFe_2$, $DyFe_3$, $TbFe_2$, $TbFe_3$, etc.) for diffusing a heavy rare earth element into the magnet are heated while being moved continuously or intermittently in a treatment chamber.

The method described in Patent Document 1 is advantageous as a method in which a heavy rare earth element can be effectively diffused, with reduced use, into an R—Fe—B based permanent magnet to improve the coercive force. However, with respect to the diffusion source made of an alloy of a heavy rare earth element and iron used in this method, the present inventors have found that after repeated use, the heavy rare earth element content of the diffusion source decreases. According to the study by the present inventors, this is attributable to that when an R—Fe—B based permanent magnet and the diffusion source are heated while being moved continuously or intermittently in a treatment chamber, the surface of the diffusion source is fractured, and the resulting fragments of the diffusion source adhere to the surface of the magnet, while the surface of the magnet is fractured, and the resulting fragments of the magnet adhere to the surface of the diffusion source, for example. When the heavy rare earth element content of the diffusion source decreases, the efficiency of the diffusion of the heavy rare earth element into the R—Fe—B based permanent magnet also decreases, and thus the use of the diffusion source is stopped at a certain point. The problem here is how to treat the used diffusion source. Even if it cannot be used as a diffusion source any longer, a heavy rare earth element, which is a scarce resource, is contained therein. Therefore, rather than discarding the used diffusion source, how to recover and recycle the heavy rare earth element contained therein is an important technical challenge for the future.

Several methods have been proposed as methods for recovering a rare earth element from a workpiece containing at least a rare earth element and an iron group element. For example, Patent Document 2 proposes a method in which a workpiece is heated in an oxidizing atmosphere to convert the contained metallic elements into oxides, followed by mixing with water to form a slurry; hydrochloric acid is added with heating to dissolve a rare earth element in a solution; an alkali (sodium hydroxide, ammonia, potassium hydroxide, etc.) is added to the obtained solution with heating, thereby precipitating an iron group element leached into the solution together with the rare earth element; then the solution is separated from undissolved substances and the precipitate; and oxalic acid, for example, is added to the solution as a precipitant to recover the rare earth element in the form of an oxalate. This method is noteworthy as a method that allows a rare earth element to be effectively separated from an iron group element and recovered. However, the method has a problem in that because an acid and an alkali are used in part of the process, it is not easy to control the process, and also the recovery cost is high. Therefore, it must be said that in some aspects, the method described in Patent Document 2 is difficult to put into practical use as a recycling system that is required to be low-cost and simple.

In addition, as a method for not oxidizing an iron group element contained in a workpiece but oxidizing only a rare earth element contained in the workpiece to thereby separate the two, Patent Document 3 proposes a method in which a workpiece is heated in a carbon crucible. Unlike the method described in Patent Document 2, this method does not require an acid or an alkali. In addition, when a workpiece is heated in a carbon crucible, theoretically, the atmosphere in the crucible is autonomously controlled to an oxygen partial pressure at which iron group elements are not oxidized and only rare earth elements are oxidized. Accordingly, this method is likely to be more advantageous than the method described in Patent Document 2 in that the process is simpler. However, when it comes to the question whether the atmosphere in a carbon crucible is autonomously controlled to a predetermined oxygen partial pressure by merely heating a workpiece in a the crucible, whereby rare earth elements can be separated from iron group elements, the reality is not necessarily so. Patent Document 3 states that the oxygen content of the atmosphere in a crucible is preferably 1 ppm to 1%, but essentially no external operation is required to control the atmosphere. However, according to the study by the present inventors, at least in the case where the oxygen content is less than 1 ppm, rare earth elements cannot be separated from iron group elements. Therefore, even if it is theoretically possible that when a workpiece is heated in a carbon crucible, the atmosphere in the crucible is autonomously controlled to an oxygen partial pressure at which iron group elements are not oxidized and only rare earth elements are oxidized, in reality, the inside of the crucible has to be artificially controlled to an atmosphere having an oxygen content of 1 ppm or more. Such control can be achieved by introducing an inert gas having an oxygen content of 1 ppm or more into the crucible, as also described in Patent Document 3. However, in the case of argon gas, which is widely used as an industrial inert gas, its oxygen content is usually 0.5 ppm or less. Therefore, for introducing argon gas having an oxygen content of 1 ppm or more into a crucible, the widely used argon gas cannot be directly used, and it is necessary to especially increase the oxygen content before use. Consequently, although the process of the method described in Patent Document 3 looks simple, actually it is not. It must be said that like the method described in Patent Document 2, in some aspects, the method described in Patent Document 3 is difficult to put into practical use as a recycling system that is required to be low-cost and simple.

PRIOR ART DOCUMENTS

Patent Document

Patent Document 1: WO 2012/008426
Patent Document 2: JP-A-2009-249674
Patent Document 3: WO 2010/098381

SUMMARY OF THE INVENTION

Problems that the Invention is to Solve

Thus, an object of the present invention is to provide a method for recovering a heavy rare earth element from a workpiece containing at least a heavy rare earth element and an iron group element, which can be put into practical use as a low-cost, simple recycling system.

Means for Solving the Problems

In view of the above points, the present inventors have conducted extensive research. As a result, they have found that when, in accordance with the method described in Patent Document 1, a heavy rare earth element diffusion source made of an alloy of a heavy rare earth element and iron which has been repeatedly used to diffuse a heavy rare earth element into an R—Fe—B based permanent magnet to improve the coercive force (an used diffusion source having a reduced content of a heavy rare earth element) is subjected to an oxidation treatment, or the used diffusion source is mixed with an oxidation-treated R—Fe—B based magnet alloy, and then subjected to a heat treatment in the presence of carbon at a predetermined temperature, a heavy rare earth element contained in the used diffusion source can be separated in the form of an oxide from an iron group element and recovered.

A method for recovering a heavy rare earth element from a workpiece containing at least a heavy rare earth element and an iron group element according to the present invention accomplished based on the above findings is, as defined in a first embodiment, characterized by including at least the following step: a workpiece is subjected to an oxidation treatment or mixed with an oxidation-treated R—Fe—B based magnet alloy, and then subjected to a heat treatment in the presence of carbon at a temperature of 1000° C. or more, thereby separating a heavy rare earth element in the form of an oxide from an iron group element.

A method as defined in a second embodiment is characterized in that in the method of the first embodiment, the workpiece is subjected to an oxidation treatment and then subjected to a heat treatment in the presence of carbon at a temperature of 1000° C. or more.

A method as defined in a third embodiment is characterized in that in the method of the second embodiment, the heat treatment temperature is 1300° C. or more.

A method as defined in a fourth embodiment is characterized in that in the method of the second embodiment, the heat treatment of the oxidation-treated workpiece is performed using a carbon crucible as a treatment container and also as a carbon supply source.

A method as defined in a fifth embodiment is characterized in that in the method of the second embodiment, the heat treatment of the oxidation-treated workpiece is performed in the presence of carbon and boron.

A method as defined in a sixth embodiment is characterized in that in the method of the fifth embodiment, the heat treatment of the oxidation-treated workpiece is performed using boron oxide as a boron supply source.

A method as defined in a seventh embodiment is characterized in that in the method of the second embodiment, at least part of the workpiece is in granular or powder form having a particle size of 5 mm or less.

A method as defined in an eighth embodiment is characterized in that in the method of the second embodiment, the workpiece has an iron group element content of 30 mass % or more.

A method as defined in a ninth embodiment is characterized in that in the method of the second embodiment, the workpiece is a heavy rare earth element diffusion source made of an alloy of a heavy rare earth element and iron for diffusing a heavy rare earth element into an R—Fe—B based permanent magnet, the heavy rare earth element diffusion source having been used and thus further containing a component derived from the magnet.

A method as defined in a tenth embodiment is characterized in that in the method of the first embodiment, the workpiece is mixed with an oxidation-treated R—Fe—B based magnet alloy and then subjected to a heat treatment in the presence of carbon at a temperature of 1000° C. or more.

A method as defined in an eleventh embodiment is characterized in that in the method of the tenth embodiment, the heat treatment temperature is 1300° C. or more.

A method as defined in a twelfth embodiment is characterized in that in the method of the tenth embodiment, the oxidation-treated R—Fe—B based magnet alloy is obtained by subjection magnet scrap and/or magnet processing waste discharged during the production process of a magnet to an oxidation treatment.

A method as defined in a thirteenth embodiment is characterized in that in the method of the tenth embodiment, the amount of the oxidation-treated R—Fe—B based magnet alloy mixed with the workpiece is, in a molar ratio in terms of the amount of boron contained in the oxidation-treated magnet alloy, 2.0 times or more that of a heavy rare earth element contained in the workpiece.

A method as defined in a fourteenth embodiment is characterized in that in the method of the tenth embodiment, the heat treatment of a mixture of the workpiece and the oxidation-treated R—Fe—B based magnet alloy is performed using a carbon crucible as a treatment container and also as a carbon supply source.

A method as defined in a fifteenth embodiment is characterized in that in the method of the tenth embodiment, at least part of the workpiece and/or the oxidation-treated R—Fe—B based magnet alloy is in granular or powder form having a particle size of 5 mm or less.

A method as defined in a sixteenth embodiment is characterized in that in the method of the tenth embodiment, the workpiece has an iron group element content of 30 mass % or more.

A method as defined in a seventeenth embodiment is characterized in that in the method of the tenth embodiment, the workpiece is a heavy rare earth element diffusion source made of an alloy of a heavy rare earth element and iron for diffusing a heavy rare earth element into an R—Fe—B based permanent magnet, the heavy rare earth element diffusion source having been used and thus further containing a component derived from the magnet.

Effect of the Invention

According to the present invention, a method for recovering a heavy rare earth element from a workpiece containing at least a heavy rare earth element and an iron group element, which can be put into practical use as a low-cost, simple recycling system, can be provided.

BRIEF DESCRIPTION OF THE DRAWINGS

FIG. 1 Photographs showing the inside of the carbon crucibles furnace-cooled to room temperature after the heat treatment in Example 1.

FIG. 2 Cross-sectional SEM images of the individual particles forming the simple masses each recovered from the inside of the carbon crucible furnace-cooled to room temperature after the heat treatment in Example 5.

FIG. 3 Photographs showing the inside of the carbon crucibles furnace-cooled to room temperature after the heat treatment in Example 7.

FIG. 4 A cross-sectional SEM image of the individual particle forming the simple mass recovered from the inside of the carbon crucible furnace-cooled to room temperature after the heat treatment in Example 12.

MODE FOR CARRYING OUT THE INVENTION

The method for recovering a heavy rare earth element from a workpiece containing at least a heavy rare earth element and an iron group element of the present invention is characterized by including at least the following step: a workpiece is subjected to an oxidation treatment or mixed with an oxidation-treated R—Fe—B based magnet alloy, and then subjected to a heat treatment in the presence of carbon at a temperature of 1000° C. or more, thereby separating a heavy rare earth element in the form of an oxide from an iron group element.

First, the first method of the present invention, which is a method in which a workpiece containing at least a heavy rare earth element and an iron group element is subjected to an oxidation treatment, and then subjected to a heat treatment in the presence of carbon at a temperature of 1000° C. or more, thereby recovering a heavy rare earth element, will be described.

The workpiece containing at least a heavy rare earth element and an iron group element, to which the first method of the present invention is to be applied, is not particularly limited as long as it contains a heavy rare earth element, such as Dy or Tb, and an iron group element, such as Fe, Co, or Ni. In addition to a heavy rare earth element and an iron group element, other elements, including light rare earth elements such as Nd, Pr, and Sm, boron, and the like, may also be contained. Specifically, for example, a heavy rare earth element diffusion source made of an alloy of a heavy rare earth element and iron (e.g., an alloy piece made of $DyFe_2$, $DyFe_3$, $TbFe_2$, $TbFe_3$, etc.) for diffusing a heavy rare earth element into an R—Fe—B based permanent magnet, which has been used and thus further contains components derived from the magnet (light rare earth elements, boron, etc.), can be mentioned. However, the first method of the present invention is particularly suitable for application to a workpiece having an iron group element content of 30 mass % or more (although this depends on the mode of use, etc., for example, in the case where an alloy piece made of $DyFe_2$ or $TbFe_2$ is used as a heavy rare earth element diffusion source, the iron group element content of the used diffusion source is usually 35 mass % to 60 mass %, while in the case where an alloy piece made of $DyFe_3$ or $TbFe_3$ is used, the iron group element content of the used diffusion source is usually 40 mass % to 65 mass %). Incidentally, in order to separate a heavy rare earth element from an iron group element efficiently, the upper limit of the iron group element content of the workpiece is preferably 80 mass %. The size or form of the workpiece is not particularly limited. However, in order for the workpiece to be sufficiently oxidation-treated, it is preferable that the workpiece is in granular or powder form having a particle size of 5 mm or less, more preferably 3 mm or less. The workpiece may be prepared by grinding, etc., as necessary, to a particle size of 500 μm or less, for example. In this case, in view of the ease of preparation, etc., the lower limit of the particle size is preferably 1 μm. However, the entire workpiece does not necessarily have to be in granular or powder form of this size, and it is possible that only part of the workpiece is in granular or powder form of this size.

First, in the first method of the present invention, the oxidation treatment of a workpiece intends to convert a heavy rare earth element contained in the workpiece into an oxide. Unlike the method described in Patent Document 3, as a result of the oxidation treatment of a workpiece, not only a heavy rare earth element but also an iron group element contained in the workpiece may be converted into an oxide. The oxidation treatment of a workpiece can be easily performed by heat-treating or burning the workpiece in an oxygen-containing atmosphere. The oxygen-containing atmosphere may be ambient atmosphere. In the case where the workpiece is heat-treated, it may be performed at 350° C. to 1000° C. for 1 hour to 10 hours, for example. In the case where the workpiece is burned, it may be performed by spontaneous ignition or artificial ignition, for example. In addition, the oxidation treatment of a workpiece may also be performed by an alkali treatment, in which the oxidation of a workpiece proceeds in an aqueous alkali solution. Examples of alkalis that can be used for the alkali treatment include sodium hydroxide, potassium hydroxide, sodium hydrogen carbonate, sodium carbonate, and ammonia. In addition, the concentration of the aqueous alkali solution may be 0.1 mol/L to 10 mol/L. The treatment temperature may be 60° C. to 150° C., but is preferably 100° C. or more to increase the effectiveness of the oxidation treatment, and preferably 130° C. or less to further enhance safety. The treatment time may be 30 minutes to 10 hours. The oxidation treatment of a workpiece may be performed by a single method or may also be performed by a combination of a plurality of methods. As a result of the oxidation treatment of a workpiece in this manner, the amount of oxygen contained in the workpiece becomes, in a molar ratio, 1.5 times or more that of a heavy rare earth element, whereby the heavy rare earth element can be converted into an oxide more reliably. It is preferable that as a result of the oxidation treatment, the amount of oxygen contained in the workpiece becomes, in a molar ratio, 2.0 times or more that of a heavy rare earth element. In addition, it is preferable that the oxidation treatment of a workpiece is performed in the absence of carbon. This is because when the oxidation treatment of a workpiece is performed in the presence of carbon, a heavy rare earth element contained in the workpiece may undergo an undesirable chemical reaction with carbon, thereby inhibiting the desired conversion into an oxide (thus, "in the absence of carbon" herein means that carbon that causes a chemical reaction enough to inhibit the conversion of a heavy rare earth element contained in the workpiece into an oxide is not present).

Next, the oxidation-treated workpiece is subjected to a heat treatment in the presence of carbon at a temperature of 1000° C. or more, whereby a heavy rare earth element can be separated in the form of an oxide from an iron group element. This is based on the following phenomenon found by the present inventors. When the oxidation-treated workpiece is subjected to a heat treatment in the presence of carbon at a temperature of 1000° C. or more, whereas an oxide of a heavy rare earth element contained in the oxidation-treated workpiece remains as an oxide as it is at high temperatures, an iron group element dissolves carbon to form an alloy, or, in the case where an iron group element has been converted into an oxide by the oxidation treatment, an oxide of an iron group element is reduced by carbon and then dissolves carbon to form an alloy. As a result, an oxide of a heavy rare earth element and an alloy of an iron group element and carbon are present independently of each other. The role of carbon is thus completely different from that in the method described in Patent Document 3, in which carbon is used to oxidize only a rare earth element, without oxidizing an iron group element, contained in the workpiece.

The reason why the heat treatment temperature is specified to be 1000° C. or more is that when the temperature is less than 1000° C., the alloying of an iron group element in the workpiece with carbon does not sufficiently proceed, or, in the case where an iron group element has been converted into an oxide, the reduction of an oxide of an iron group element by carbon does not sufficiently proceed. As a result, an oxide of a heavy rare earth element and an alloy of an iron group element and carbon are less likely to be present independently of each other, making it difficult to separate the two. The heat treatment temperature is preferably 1300° C. or more, more preferably 1350° C. or more, and still more preferably 1400° C. or more. Incidentally, in view of energy cost, for example, the upper limit of the heat treatment temperature is preferably 1700° C., more preferably 1650° C., and still more preferably 1600° C. The heat treatment time is suitably 10 minutes to 30 hours, for example.

The carbon supply source to the oxidation-treated workpiece may have any structure and form, examples thereof including graphite (black lead or plumbago), charcoal, coke, coal, diamond, and carbon black. However, when a carbon crucible is used in the heat treatment, the carbon crucible serves as a treatment container and also as a carbon supply source from the surface thereof, and this is thus advantageous (needless to say, this does not discourage the further addition of other carbon supply sources). In the case where a carbon crucible is used as a treatment container, the heat treatment of the oxidation-treated workpiece in the presence of carbon is preferably performed in an inert gas atmosphere such as an argon gas atmosphere (the oxygen content is preferably less than 1 ppm) or in vacuum (preferably less than 1000 Pa). This is because when the heat treatment is performed in an oxygen-containing atmosphere such as ambient atmosphere, oxygen in the atmosphere may react with carbon on the surface of the carbon crucible to form carbon dioxide, preventing the carbon crucible from efficiently serving as a carbon supply source.

Incidentally, treatment containers that can be used are not limited to a carbon crucible as in the method described in Patent Document 3, and it is also possible to use a non-carbon treatment container, such as a ceramic crucible made of a metal oxide like alumina, magnesium oxide, or calcium oxide or silicon oxide (such a crucible may be made of a single material or a plurality of materials, and examples include those made of a material that contains elemental carbon but does not serve as a carbon supply source, such as silicon carbide). In the case where a non-carbon treatment container is used, the treatment container does not serve as a carbon supply source. Therefore, a carbon supply source is added to the treatment container to perform the heat treatment of the oxidation-treated workpiece. In addition, when an iron-making blast furnace, an electric furnace, an induction furnace, or the like is used as a non-carbon treatment container, and charcoal, coke, or the like is used as a carbon supply source, the oxidation-treated workpiece can be subjected to a heat treatment in a large amount at once. In the case where a non-carbon treatment container is used, the heat treatment of the oxidation-treated workpiece in the presence of carbon may be performed in an inert gas atmosphere such as an argon gas atmosphere (the oxygen content is preferably less than 1 ppm) or in vacuum (preferably less than 1000 Pa), and may also be performed in an oxygen-containing atmosphere such as ambient atmosphere. In the case where the heat treatment of the oxidation-treated workpiece in the presence of carbon is performed in an oxygen-containing atmosphere, this is advantageous in that the excess carbon supply source in the treatment container after the heat treatment reacts with oxygen in the atmosphere to form carbon dioxide and thus is discharged from the treatment container.

It is preferable that the amount of the carbon supply source added is, in a molar ratio, 1.5 times or more that of an iron group element contained in the workpiece. By such adjustment of the amount of the carbon supply source added, even when the iron group element contained in the workpiece is converted into an oxide by the oxidation treatment, the reduction thereof can be ensured, allowing for the progress of alloying with carbon.

The heat treatment of the oxidation-treated workpiece may also be performed in the presence of carbon and boron. The significance of the presence of boron in the heat treatment step is not necessarily clear. However, the present inventors believe that boron is incorporated into an oxide of a heavy rare earth element contained in the oxidation-treated workpiece and enhances the meltability of the oxide of a heavy rare earth element, thereby contributing to the improvement of separability from an iron group element. Examples of boron supply sources to the oxidation-treated workpiece include, in addition to elemental boron, boron compounds such as boron oxide and boric acid. Among them, it is preferable to use boron oxide, which is inexpensive and has high stability. In order to efficiently recover a heavy rare earth element contained in the workpiece in the form of an oxide, it is preferable that the amount of the boron supply source added is, in a molar ratio in terms of the amount of boron contained in the boron supply source, 0.25 times or more that of a heavy rare earth element contained in the workpiece, more preferably 0.30 times or more, and still more preferably 0.35 times or more. Incidentally, in order to minimize the amount of boron incorporated into an oxide of a heavy rare earth element, the upper limit of the amount of the boron supply source added is preferably, in a molar ratio in terms of the amount of boron contained in the boron supply source, 4.0 times that of a heavy rare earth element contained in the workpiece, more preferably 3.0 times, and still more preferably 1.0 time.

When the oxidation-treated workpiece is subjected to a heat treatment as above and then cooled, depending on the difference in the heat treatment temperature or heat treatment time, the difference in the amount supplied of carbon or boron, etc., in the treatment container, two kinds of masses are present independently of but in close contact with each other, a mass and a powder are present, a single-form mass having adhering to the sphere surface thereof an adhering substance that easily comes off upon the application of physical impact is present, a powder with individual particles having adhering to the sphere surface thereof an adhering substance that easily comes off upon the application of physical impact is present, or a simple mass made of coarse particles joined together is present. An oxide of a heavy rare earth element contained in an oxidation-treated workpiece can be recovered as one of the two kinds of masses that are present independently of but in close contact with each other, as the powder in the case where a mass and a powder are present, or as the adhering substance adhering to the sphere surface and forming the single-form mass or the individual particles of the powder. Such modes are often seen in the case where the heat treatment is performed in the presence of carbon and boron at a temperature of 1300° C. or more (although this depends on the series of the treatment conditions, etc., in the case where the amount of the boron supply source added is small, such as the case where the amount of the boron supply source added is, in a molar ratio in terms of the amount of boron contained in the boron supply source, 1.0 time or less that of a heavy rare earth element contained in the workpiece, the oxide tends to be recovered as one of the two kinds of masses that are present independently of but in close contact with each other, while in the case where it is more than 1.0 time, it tends to be recovered as the powder in the case where a mass and a powder are present). Incidentally, the other of the two kinds of masses that are present independently of but in close contact with each other, the mass in the case where a mass and a powder are present, and the sphere forming the single-form mass or the individual particles of the powder are each an alloy of an iron group element and carbon. In addition, in the case where the heat treatment temperature is less than 1300° C., or in the case where the heat treatment temperature is 1300° C. or more, but boron is not present, a simple mass made of coarse particles joined together is often obtained as the product. Individual particles forming this mass each have a two phase structure, and one of them is an oxide of a heavy rare earth element contained in the oxidation-treated workpiece, while the other is an alloy of an iron group element and carbon. Therefore, when the individual particles forming this mass are ground to a size of 10 μm or less, for example (the level of grinding is preferably 5 μm or less, more preferably 3 μm or less, and still more preferably 1 μm or less; the lower limit is 0.1 μm, for example), and a powder of the phase made of an alloy of an iron group element and carbon is separated by a magnetic method, a powder of the phase made of an oxide of a heavy rare earth element contained in the oxidation-treated workpiece can be recovered. In addition, in an inert gas atmosphere or in vacuum, when this mass is melted by a heat treatment in the presence of boron at a temperature of 1300° C. or more, an oxide of a heavy rare earth element contained in the oxidation-treated workpiece can be recovered as one of the two kinds of masses that are present independently of but in close contact with each other.

In addition, in the case where the oxidation-treated workpiece is subjected to a heat treatment in the presence of carbon and boron at a temperature of 1300° C. or more, when an oxide of a heavy rare earth element and an alloy of an iron group element and carbon are both melted, these melts do not mix with each other. Instead, because the former melt has a smaller specific gravity than the latter melt, the former melt is present floating on the surface of the latter melt, and thus the two can be easily separated. In addition, in the case where a mass of an oxide of a heavy rare earth element and a mass of an alloy of an iron group element and carbon are present in a treatment container independently of but in close contact with each other, when they are subjected to a heat treatment at a temperature of 1300° C. or more, both masses are melted, and the latter melt forms a diffusion layer spreading over the surface of the treatment container, while the former melt is present floating on the surface of the latter melt. Thus, the former melt can be easily separated from the latter melt. In addition, by utilizing this phenomenon, when a treatment container, in which a mass of an oxide of a heavy rare earth element and a mass of an alloy of an iron group element and carbon are present independently of but in close contact with each other, is positioned upside down and subjected to a heat treatment in an inert gas atmosphere such as argon gas (the oxygen content is preferably less than 1 ppm) or in vacuum (preferably less than 1000 Pa) at a temperature of 1300° C. or more (the heat treatment time is suitably 10 minutes to 3 hours, for example), only the former melt falls down and thus can be separated from the latter melt.

An oxide of a heavy rare earth element recovered by separation from an alloy of an iron group element and carbon in such a manner can be reduced by molten salt electrolysis, for example, and thus converted into a heavy rare earth metal. Incidentally, in the case where the workpiece contains a light rare earth element derived from a magnet in addition to a heavy rare earth element, such as a used heavy rare earth element diffusion source for diffusing a heavy rare earth element into an R—Fe—B based permanent magnet, as a result of the oxidation treatment of the workpiece and the heat treatment of the oxidation-treated workpiece as above, both the heavy rare earth element and the light rare earth element are converted into oxides and separated from an iron group element, and a mixture of the oxide of the heavy rare earth element and the oxide of the light rare earth element is obtained. The oxides can be separated from the mixture according to the kind of a rare earth element by solvent extraction, for example. The oxide of each rare earth element thus separated can be reduced by molten salt electrolysis, for example, and thus converted into each rare earth metal. Accordingly, in this case, in the above description of the oxidation treatment of a workpiece and the heat treatment of an oxidation-treated workpiece, "heavy rare earth element" can be read as "heavy rare earth element and light rare earth element".

Incidentally, in the case where a large amount of boron is contained in the oxide of a heavy rare earth element recovered by separation from an alloy of an iron group element and carbon by the first method of the present invention, when such an oxide is reduced by molten salt electrolysis using a fluorine-containing molten salt component, boron contained in the oxide of a heavy rare earth element may react with fluorine to produce harmful boron fluoride. Therefore, in such a case, it is preferable to previously reduce the boron content of the oxide of a heavy rare earth element. The boron content of a boron-containing oxide of a heavy rare earth element can be reduced, for example, by a heat treatment of the boron-containing oxide of a heavy rare earth element together with a carbonate of an alkali metal (lithium carbonate, sodium carbonate, potassium carbonate, etc.) or an oxide of an alkali metal in the presence of carbon, for example. The heat treatment in the presence of carbon to reduce the boron content may be performed at 1300° C. to 1600° C. using graphite (black lead or plumbago), charcoal, coke, coal, diamond, carbon black, or the like as a carbon supply source, for example. The heat treatment time is suitably 30 minutes to 5 hours, for example. When a carbon crucible is used in the heat treatment, the carbon crucible serves as a treatment container and also as a carbon supply source from the surface thereof, and this is thus advantageous (needless to say, this does not discourage the further addition of other carbon supply sources). The amount of a carbonate or an oxide of an alkali metal used may be 0.1 parts by weight to 2 parts by weight per part by weight of a boron-containing oxide of a heavy rare earth element, for example. Incidentally, in the case where the workpiece contains a light rare earth element in addition to a heavy rare earth element, "heavy rare earth element" in this description can be read as "heavy rare earth element and light rare earth element".

Next, the second method of the present invention, which is a method in which a workpiece containing at least a heavy rare earth element and an iron group element is mixed with an oxidation-treated R—Fe—B based magnet alloy, and then subjected to a heat treatment in the presence of carbon at a temperature of 1000° C. or more, thereby recovering a heavy rare earth element, will be described.

The workpiece containing at least a heavy rare earth element and an iron group element, to which the second method of the present invention is to be applied, is not particularly limited as long as it contains a heavy rare earth element, such as Dy or Tb, and an iron group element, such as Fe, Co, or Ni. In addition to a heavy rare earth element and an iron group element, other elements, including light rare earth elements such as Nd, Pr, and Sm, boron, and the like, may also be contained. Specifically, for example, a heavy rare earth element diffusion source made of an alloy of a heavy rare earth element and iron (e.g., an alloy piece made of $DyFe_2$, $DyFe_3$, $TbFe_2$, $TbFe_3$, etc.) for diffusing a heavy rare earth element into an R—Fe—B based permanent magnet, which has been used and thus further contains components derived from the magnet (light rare earth elements, boron, etc.), can be mentioned. However, the second method of the present invention is particularly suitable for application to a workpiece having an iron group element content of 30 mass % or more (although this depends on the mode of use, etc., for example, in the case where an alloy piece made of $DyFe_2$ or $TbFe_2$ is used as a heavy rare earth element diffusion source, the iron group element content of the used diffusion source is usually 35 mass % to 60 mass %, while in the case where an alloy piece made of $DyFe_3$ or $TbFe_3$ is used, the iron group element content of the used diffusion source is usually 40 mass % to 65 mass %). Incidentally, in order to separate a heavy rare earth element from an iron group element efficiently, the upper limit of the iron group element content of the workpiece is preferably 80 mass %. The workpiece may be one that has not undergone natural oxidation or an artificial oxidation treatment, but may also be one that has undergone natural oxidation or an artificial oxidation treatment. The method for an artificial oxidation treatment may be a method in which the workpiece is heat-treated or burned in an oxygen-containing atmosphere. The oxygen-containing atmosphere may be ambient atmosphere. The heat treatment may be performed at 350° C. to 1000° C. for 1 hour to 10 hours, for example. The burning may be performed by spontaneous ignition or artificial ignition, for example. The size or form of the workpiece is not particularly limited. However, it is preferable that the workpiece is in granular or powder form having a particle size of 5 mm or less, more preferably 3 mm or less. The workpiece may be prepared by grinding, etc., as necessary, to a particle size of 500 µm or less, for example. In this case, in view of the ease of preparation, etc., the lower limit of the particle size is preferably 1 µm. In the case where the workpiece is in granular or powder form of this size, when it is mixed with an oxidation-treated R—Fe—B based magnet alloy and then subjected to the below-described heat treatment, a heavy rare earth element contained in the workpiece can be efficiently recovered in the form of an oxide. However, the entire workpiece does not necessarily have to be in granular or powder form of this size, and it is possible that only part of the workpiece is in granular or powder form of this size.

In the second method of the present invention, an R—Fe—B based magnet alloy to be oxidation-treated means an alloy having a composition of an R—Fe—B based permanent magnet. Any alloy is possible as long as it has the predetermined alloy composition, including not only molded bodies that have been magnetized and thus have characteristics as permanent magnets, but also alloy pieces, alloy powders, and the like used as magnet raw materials. However, among them, it is preferable to use magnet scrap or magnet processing waste discharged during the production process of an R—Fe—B based permanent magnet. This is for the following reason. In recent years, with an increase in the amounts of R—Fe—B based permanent magnets produced, the amounts of magnet scrap discharged as a defectively processed product or the like and magnet processing waste discharged as cutting waste, grinding waste, or the like during the production process have also been increasing. Thus, the above allows for the effective use of them, and also rare earth elements contained therein can be recovered together with a heavy rare earth element contained in the workpiece. The size or form of the R—Fe—B based magnet alloy to be oxidation-treated is not particularly limited. However, it is preferable that the magnet alloy is in granular or powder form having a particle size of 5 mm or less, more preferably 3 mm or less. It is still more preferable that the R—Fe—B based magnet alloy to be oxidation-treated is prepared by grinding, etc., to a particle size of 500 µm or less. In this case, in view of the ease of preparation, etc., the lower limit of the particle size is preferably 1 µm. In the case where the R—Fe—B based magnet alloy to be oxidation-treated is in granular or powder form of this size, when it is oxidation-treated, then mixed with a workpiece, and subjected to the below-described heat treatment, a heavy rare earth element contained in the workpiece can be efficiently recovered in the form of an oxide, and also a rare earth element contained in the magnet alloy can be efficiently recovered. However, the entire R—Fe—B based magnet alloy to be oxidation-treated does not necessarily have to be in granular or powder form of this size, and it is possible that only part of the magnet alloy is in granular or powder form of this size.

The oxidation treatment of an R—Fe—B based magnet alloy intends to convert a rare earth element and an iron group element contained in the magnet alloy into oxides and thereby incorporate oxygen into the magnet alloy, by utilizing oxygen incorporated into the magnet alloy, a workpiece is oxidized by the below-described heat treatment, and a heavy rare earth element contained in the workpiece is converted into an oxide and recovered. In order to reliably convert a heavy rare earth element contained in a workpiece into an oxide, it is preferable that the oxidation treatment of an R—Fe—B based magnet alloy is performed such that the amount of oxygen contained in the oxidation-treated magnet alloy will be, in a molar ratio, 1.5 times or more the total amounts of a heavy rare earth element contained in the workpiece and a rare earth element contained in the magnet alloy, more preferably 2.0 times or more. The effective oxidation treatment of an R—Fe—B based magnet alloy can be easily performed by heat-treating or burning the magnet alloy in an oxygen-containing atmosphere. The oxygen-containing atmosphere may be ambient atmosphere. In the case where the R—Fe—B based magnet alloy is heat-treated, it may be performed at 350° C. to 1000° C. for 1 hour to 10 hours, for example. In the case where the R—Fe—B based magnet alloy is burned, it may be performed by spontaneous ignition or artificial ignition, for example. The oxidation treatment of an R—Fe—B based magnet alloy may be performed by a single method or may also be performed by a combination of a plurality of methods. It is preferable that the oxidation treatment of an R—Fe—B based magnet alloy is performed in the absence of carbon. This is because when the oxidation treatment of an R—Fe—B based magnet alloy is performed in the presence of carbon, a rare earth element and an iron group element contained in the magnet alloy may undergo an undesirable chemical reaction with carbon, thereby inhibiting the conversion into oxides, which may also inhibit the conversion of a heavy rare earth element contained in the workpiece into an oxide by the below-described heat treatment (thus, "in the absence of carbon" herein means that carbon that causes a chemical reaction enough to inhibit the conversion of a rare earth element and an iron group element contained in the magnet alloy into oxides is not present).

Next, the workpiece is mixed with the oxidation-treated R—Fe—B based magnet alloy, and then subjected to a heat treatment in the presence of carbon at a temperature of 1000° C. or more, whereby a heavy rare earth element can be separated in the form of an oxide from an iron group element. This is based on the following phenomenon. When a mixture of the workpiece and the oxidation-treated R—Fe—B based magnet alloy is subjected to a heat treatment in the presence of carbon at a temperature of 1000° C. or more, the workpiece is oxidized by oxygen contained in the oxidation-treated magnet alloy, whereby a heavy rare earth element contained in the workpiece is converted into an oxide and remains as an oxide as it is at high temperatures, while an iron group element dissolves carbon to form an alloy, or, in the case where an iron group element has been converted into an oxide, an oxide of an iron group element is reduced by carbon and then dissolves carbon to form an alloy. As a result, an oxide of a heavy rare earth element and an alloy of an iron group element and carbon are present independently of each other. In addition, when this phenomenon occurs, the following phenomenon also occurs. An oxide of a rare earth element contained in the oxidation-treated R—Fe—B based magnet alloy also remains as an oxide as it is at high temperatures, while an oxide of an iron group element is reduced by carbon and then dissolves carbon to form an alloy. As a result, an oxide of a rare earth element and an alloy of an iron group element and carbon are present independently of each other. Accordingly, as a result, an oxide of a heavy rare earth element contained in the workpiece or an oxide of a rare earth element contained in the oxidation-treated R—Fe—B based magnet alloy and an alloy of an iron group element and carbon contained in the workpiece or an alloy of an iron group element and carbon contained in the oxidation-treated magnet alloy are present independently of each other.

The reason why the heat treatment temperature is specified to be 1000° C. or more is that when the temperature is less than 1000° C., the reduction of an oxide of an iron group element in the case where an iron group element contained in the workpiece is converted into an oxide or of an oxide of an iron group element contained in the oxidation-treated R—Fe—B based magnet alloy by carbon does not sufficiently proceed, or the alloying of an iron group element with carbon does not sufficiently proceed. As a result, an oxide of a heavy rare earth element contained in the workpiece or an oxide of a rare earth element contained in the oxidation-treated magnet alloy and an alloy of an iron group element and carbon contained in the workpiece or an oxide of an iron group element and carbon contained in the oxidation-treated magnet alloy are less likely to be present independently of each other, making it difficult to separate the two. The heat treatment temperature is preferably 1300° C. or more, more preferably 1350° C. or more, and still more preferably 1400° C. or more. In the case where the heat treatment temperature is 1300° C. or more, an oxide of a heavy rare earth element contained in the workpiece or an oxide of a rare earth element contained in the oxidation-treated R—Fe—B based magnet alloy and an alloy of an iron group element and carbon contained in the workpiece or an alloy of an iron group element and carbon contained in the oxidation-treated magnet alloy are melted without mixing with each other by compatibility, making it possible to separate the two as independent melts. The present inventors believe that this phenomenon is resulted from boron contained in the oxidation-treated R—Fe—B based magnet alloy, which is incorporated into an oxide of a heavy rare earth element contained in the workpiece, thereby contributing to the enhancement of the meltability of the oxide of a heavy rare earth element, and also contributing to the enhancement of the meltability of the oxide of a rare earth element contained in the oxidation-treated magnet alloy. Incidentally, in view of energy cost, for example, the upper limit of the heat treatment temperature is preferably 1700° C., more preferably 1650° C., and still more preferably 1600° C. The heat treatment time is suitably 10 minutes to 30 hours, for example.

The carbon supply source to a mixture of the workpiece and the oxidation-treated R—Fe—B based magnet alloy may have any structure and form, examples thereof including graphite (black lead or plumbago), charcoal, coke, coal, diamond, and carbon black. However, when a carbon crucible is used in the heat treatment, the carbon crucible serves as a treatment container and also as a carbon supply source from the surface thereof, and this is thus advantageous (needless to say, this does not discourage the further addition of other carbon supply sources). In the case where a carbon crucible is used as a treatment container, the heat treatment of a mixture of the workpiece and the oxidation-treated R—Fe—B based magnet alloy in the presence of carbon is preferably performed in an inert gas atmosphere such as an argon gas atmosphere (the oxygen content is preferably less than 1 ppm) or in vacuum (preferably less than 1000 Pa). This is because when the heat treatment is performed in an oxygen-containing atmosphere such as ambient atmosphere, oxygen in the atmosphere may react with carbon on the surface of the carbon crucible to form carbon dioxide, preventing the carbon crucible from efficiently serving as a carbon supply source.

Incidentally, treatment containers that can be used are not limited to a carbon crucible as in the method described in Patent Document 3, and it is also possible to use a non-carbon treatment container, such as a ceramic crucible made of a metal oxide like alumina, magnesium oxide, or calcium oxide or silicon oxide (such a crucible may be made of a single material or a plurality of materials, and examples include those made of a material that contains elemental carbon but does not serve as a carbon supply source, such as silicon carbide). In the case where a non-carbon treatment container is used, the treatment container does not serve as a carbon supply source. Therefore, a carbon supply source is added to the treatment container to perform the heat treatment of a mixture of the workpiece and the oxidation-treated R—Fe—B based magnet alloy. In addition, when an iron-making blast furnace, an electric furnace, an induction furnace, or the like is used as a non-carbon treatment container, and charcoal, coke, or the like is used as a carbon supply source, a mixture of the workpiece and the oxidation-treated R—Fe—B based magnet alloy can be subjected to a heat treatment in a large amount at once. In the case where a non-carbon treatment container is used, the heat treatment of a mixture of the workpiece and the oxidation-treated R—Fe—B based magnet alloy in the presence of carbon may be performed in an inert gas atmosphere such as an argon gas atmosphere (the oxygen content is preferably less than 1 ppm) or in vacuum (preferably less than 1000 Pa), and may also be performed in an oxygen-containing atmosphere such as ambient atmosphere. In the case where the heat treatment of a mixture of the workpiece and the oxidation-treated R—Fe—B based magnet alloy in the presence of carbon is performed in an oxygen-containing atmosphere, this is advantageous in that the excess carbon supply source in the treatment container after the heat treatment reacts with oxygen in the atmosphere to form carbon dioxide and thus is discharged from the treatment container.

It is preferable that the amount of the carbon supply source added is, in a molar ratio, 1.5 times or more the total amounts of an iron group element contained in the workpiece and an iron group element contained in the oxidation-treated R—Fe—B based magnet alloy. By such adjustment of the amount of the carbon supply source added, even when the iron group element contained in the workpiece is converted into an oxide, together with an oxide of an iron group element contained in the oxidation-treated R—Fe—B based magnet alloy, the reduction thereof can be ensured, allowing for the progress of alloying with carbon.

It is preferable that the amount of the oxidation-treated R—Fe—B based magnet alloy mixed with the workpiece is, in a molar ratio in terms of the amount of boron contained in the oxidation-treated magnet alloy, 2.0 times or more that of a heavy rare earth element contained in the workpiece, more preferably 3.0 times or more. When the amount of the oxidation-treated R—Fe—B based magnet alloy mixed with the workpiece is such an amount, an oxide of a heavy rare earth element contained in the workpiece or an oxide of a rare earth element contained in the oxidation-treated magnet alloy and an alloy of an iron group element and carbon contained in the workpiece or an alloy of an iron group element and carbon contained in the oxidation-treated magnet alloy are more likely to be present independently of each other, making it easier to separate the two (in the case where the heat treatment temperature is 1300° C. or more, an oxide of a heavy rare earth element contained in the workpiece or an oxide of a rare earth element contained in the oxidation-treated magnet alloy and an alloy of an iron group element and carbon contained in the workpiece or an alloy of an iron group element and carbon contained in the oxidation-treated magnet alloy can be separated more easily as independent melts). Incidentally, in terms of minimizing the amount of boron incorporated into an oxide of a heavy rare earth element, or in terms of efficiently recovering an oxide of a heavy rare earth element, the upper limit of the amount of the oxidation-treated R—Fe—B based magnet alloy mixed with the workpiece is preferably, in a molar ratio in terms of the amount of boron contained in the oxidation-treated magnet alloy, 15.0 times that of a heavy rare earth element contained in the workpiece, more preferably 10.0 times.

When a mixture of the workpiece and the oxidation-treated R—Fe—B based magnet alloy is subjected to a heat treatment as above and then cooled, depending on the difference in the heat treatment temperature or heat treatment time, the difference in the amount supplied of carbon or boron, etc., in the treatment container, two kinds of masses are present independently of but in close contact with each other, a single-form mass having adhering to the sphere surface thereof an adhering substance that easily comes off upon the application of physical impact is present, a powder with individual particles having adhering to the sphere surface thereof an adhering substance that easily comes off upon the application of physical impact is present, or a simple mass made of coarse particles joined together is present. An oxide of a heavy rare earth element contained in the workpiece and an oxide of a rare earth element contained in the oxidation-treated R—Fe—B based magnet alloy can each be recovered as one of the two kinds of masses that are present independently of but in close contact with each other, or as the adhering substance adhering to the sphere surface and forming the single-form mass or the individual particles of the powder. Such modes are often seen in the case where the heat treatment temperature is 1300° C. or more. Incidentally, the other of the two kinds of masses that are present independently of but in close contact with each other, and the sphere forming the single-form mass or the individual particles of the powder are each an alloy of an iron group element and carbon contained in the workpiece or an alloy of an iron group element and carbon contained in the oxidation-treated R—Fe—B based magnet alloy. In addition, in the case where the heat treatment temperature is less than 1300° C., a simple mass made of coarse particles joined together is often obtained as the product. Individual particles forming this mass each have a two phase structure, and one of them is an oxide of a heavy rare earth element contained in the workpiece or an oxide of a rare earth element contained in the oxidation-treated R—Fe—B based magnet alloy, while the other is an alloy of an iron group element and carbon contained in the workpiece or an alloy of an iron group element and carbon contained in the oxidation-treated magnet alloy. Therefore, when the individual particles forming this mass are ground to a size of 10 μm or less, for example (the level of grinding is preferably 5 μm or less, more preferably 3 μm or less, and still more preferably 1 μm or less; the lower limit is 0.1 for example), and a powder of the phase made of an alloy of an iron group element and carbon contained in the workpiece or an alloy of an iron group element and carbon contained in the oxidation-treated R—Fe—B based magnet alloy is separated by a magnetic method, a powder of the phase made of an oxide of a heavy rare earth element contained in the workpiece or an oxide of a rare earth element contained in the oxidation-treated magnet alloy can be recovered. In addition, in an inert gas atmosphere or in vacuum, when this mass is melted by a heat treatment at a temperature of 1300° C. or more, an oxide of a heavy rare earth element contained in the workpiece or an oxide of a rare earth element contained in the oxidation-treated R—Fe—B based magnet alloy can be recovered as one of the two kinds of masses that are present independently of but in close contact with each other.

In addition, in the case where the heat treatment temperature is 1300° C. or more, when an oxide of a heavy rare earth element contained in the workpiece or an oxide of a rare earth element contained in the oxidation-treated R—Fe—B based magnet alloy and an alloy of an iron group element and carbon contained in the workpiece or an alloy of an iron group element and carbon contained in the oxidation-treated magnet alloy are both melted, these melts do not mix with each other. Instead, because the former melt has a smaller specific gravity than the latter melt, the former melt is present floating on the surface of the latter melt, and thus the two can be easily separated. In addition, in the case where a mass of an oxide of a heavy rare earth element contained in the workpiece or of an oxide of a rare earth element contained in the oxidation-treated R—Fe—B based magnet alloy and a mass of an alloy of an iron group element and carbon contained in the workpiece or of an alloy of an iron group element and carbon contained in the oxidation-treated magnet alloy are present in a treatment container independently of but in close contact with each other, when they are subjected to a heat treatment at a temperature of 1300° C. or more, both masses are melted, and the latter melt forms a diffusion layer spreading over the surface of the treatment container, while the former melt is present floating on the surface of the latter melt. Thus, the former melt can be easily separated from the latter melt. In addition, by utilizing this phenomenon, when a treatment container, in which a mass of an oxide of a heavy rare earth element contained in the workpiece or of an oxide of a rare earth element contained in the oxidation-treated R—Fe—B based magnet alloy and a mass of an alloy of an iron group element and carbon contained in the workpiece or of an alloy of an iron group element and carbon contained in the oxidation-treated magnet alloy are present independently of but in close contact with each other, is positioned upside down and subjected to a heat treatment in an inert gas atmosphere such as argon gas (the oxygen content is preferably less than 1 ppm) or in vacuum (preferably less than 1000 Pa) at a temperature of 1300° C. or more (the heat treatment time is suitably 10 minutes to 3 hours, for example), only the former melt falls down and thus can be separated from the latter melt.

An oxide of a heavy rare earth element contained in the workpiece and an oxide of a rare earth element contained in the oxidation-treated magnet alloy, which are recovered by separation from an alloy of an iron group element and carbon contained in the workpiece and an alloy of an iron group element and carbon contained in the oxidation-treated R—Fe—B based magnet alloy in such a manner, can be separated according to the kind of a rare earth element by solvent extraction, for example. The oxide of each rare earth element thus separated can be reduced by molten salt electrolysis, for example, and thus converted into each rare earth metal. Incidentally, in the case where the workpiece contains a light rare earth element derived from a magnet in addition to a heavy rare earth element, such as a used heavy rare earth element diffusion source for diffusing a heavy rare earth element into an R—Fe—B based permanent magnet, as a result of the above heat treatment, both the heavy rare earth element and the light rare earth element are converted into oxides and separated from an iron group element, and an oxide of a heavy rare earth element and an oxide of a light rare earth element are obtained. Accordingly, in this case, in the above description of the heat treatment, "heavy rare earth element" can be read as "heavy rare earth element and light rare earth element".

Incidentally, in the case where a large amount of boron is contained in the oxide of a heavy rare earth element contained in the workpiece or the oxide of a rare earth element contained in the oxidation-treated magnet alloy recovered by separation from an alloy of an iron group element and carbon contained in the workpiece or an alloy of an iron group element and carbon contained in the oxidation-treated R—Fe—B based magnet alloy by the second method of the present invention, when such an oxide is reduced by molten salt electrolysis using a fluorine-containing molten salt component, boron contained in the oxide of a heavy rare earth element contained in the workpiece or the oxide of a rare earth element contained in the oxidation-treated magnet alloy may react with fluorine to produce harmful boron fluoride. Therefore, in such a case, it is preferable to previously reduce the boron content of the oxide of a heavy rare earth element contained in the workpiece or the oxide of a rare earth element contained in the oxidation-treated magnet alloy. The boron content of a boron-containing oxide of a heavy rare earth element contained in the workpiece or a boron-containing oxide of a rare earth element contained in the oxidation-treated R—Fe—B based magnet alloy can be reduced, for example, by a heat treatment of the boron-containing oxide of a heavy rare earth element contained in the workpiece or the boron-containing oxide of a rare earth element contained in the oxidation-treated magnet alloy together with a carbonate of an alkali metal (lithium carbonate, sodium carbonate, potassium carbonate, etc.) or an oxide of an alkali metal in the presence of carbon, for example. The heat treatment in the presence of carbon to reduce the boron content may be performed at 1300° C. to 1600° C. using graphite (black lead or plumbago), charcoal, coke, coal, diamond, carbon black, or the like as a carbon supply source, for example. The heat treatment time is suitably 30 minutes to 5 hours, for example. When a carbon crucible is used in the heat treatment, the carbon crucible serves as a treatment container and also as a carbon supply source from the surface thereof, and this is thus advantageous (needless to say, this does not discourage the further addition of other carbon supply sources). The amount of a carbonate or an oxide of an alkali metal used may be 0.1 parts by weight to 2 parts by weight per part by weight of a boron-containing oxide of a heavy rare earth element contained in the workpiece or a boron-containing oxide of a rare earth element contained in the oxidation-treated R—Fe—B based magnet alloy, for example. Incidentally, in the case where the workpiece contains a light rare earth element in addition to a heavy rare earth element, "heavy rare earth element" in this description can be read as "heavy rare earth element and light rare earth element".

EXAMPLES

Hereinafter, the present invention will be described in detail with reference to the examples. However, the present invention should not be construed as being limited to the following descriptions.

First Method of the Present Invention

Example 1

A Dy diffusion source prepared in accordance with the method described in Patent Document 1 for diffusing Dy as a heavy rare earth element into an R—Fe—B based permanent magnet (an alloy piece made of DyFe$_2$, the weight ratio being approximately Dy:Fe=59:41), which had been used for a predetermined period of time at a temperature range of 850° C. to 1000° C. in accordance with the method described in Patent Document 1 (an used Dy diffusion source, granular form having a particle size of 2 mm or less), was subjected to a heat treatment in ambient atmosphere at 900° C. for 5 hours, thereby performing an oxidation treatment. Table 1 shows the results of ICP analysis of the used Dy diffusion source before the oxidation treatment and the oxidation-treated used Dy diffusion source (apparatus used: ICPV-1017 manufactured by Shimadzu Corporation, the same hereinafter). The amount of oxygen contained in the oxidation-treated used Dy diffusion source was, in a molar ratio, 4.4 times that of rare earth elements (Dy, which is a heavy rare earth element, and Nd and Pr, which are light rare earth elements).

TABLE 1

|  | Fe | Nd | Pr | Dy | B | Others |
|---|---|---|---|---|---|---|
| Before Oxidation Treatment | 39.7 | 19.4 | 0.07 | 34.7 | 0.24 | 5.89 |
| After Oxidation Treatment | 31.55 | 15.32 | 0.06 | 27.26 | 0.18 | 25.63 |

(Unit: mass %)

Next, 5.00 g of the oxidation-treated used Dy diffusion source was mixed with each amount of boron oxide (B$_2$O$_3$), placed in a carbon crucible (made of black lead) having a dimension of 35 mm in outer diameter×15 mm in height×5 mm in thickness, and then subjected to a heat treatment in an industrial argon gas atmosphere (oxygen content: 0.2 ppm, flow rate: 5 L/min, the same hereinafter) at 1450° C. for 1 hour. Subsequently, the carbon crucible was furnace-cooled to room temperature. FIG. 1 shows the inside of each carbon crucible furnace-cooled to room temperature after the heat treatment. As is clear from FIG. 1, in the case where the amount of boron oxide supplied was small (the amount added: 0.13 g, 0.20 g, 0.27 g), in the crucible, two kinds of masses A and B were present independently of but in close contact with each other and fixed to the crucible. Meanwhile, in the case where the amount of boron oxide supplied was large (the amount added: 0.93 g, 1.22 g), in the crucible, a mass A and a powder B were present without fixing to the crucible. Table 2 shows the results of SEM-EDX analysis of the mass A, the mass B, and the powder B (apparatus used: 54500 manufactured by Hitachi High-Technologies Corporation, the same hereinafter) ("molar ratio" in the table means the molar ratio of the amount of boron supplied by boron oxide to the rare earth elements (Dy, Nd, Pr) contained in the oxidation-treated used Dy diffusion source, the same hereinafter). As is clear from Table 2, it turned out that the main component of the mass A was iron, while the main components of the mass B and the powder B were rare earth elements, and that Dy, which is a heavy rare earth element, and also Nd and Pr, which are light rare earth elements, had been separated in the form of oxides from iron (to make sure, X-ray diffraction analysis was separately performed using a standard sample to confirm that these rare earth elements were oxides). In addition, boron was contained in the mass B and the powder B (based on ICP analysis performed separately).

TABLE 2

| Amount of Boron Oxide Added (Molar Ratio) |  | Fe | Nd | Pr | Dy | Al | C | O |
|---|---|---|---|---|---|---|---|---|
| 0.13 g (0.27) | Mass A | 95.9 | — | — | — | — | 4.1 | — |
|  | Mass B | — | 31.3 | — | 59.3 | 0.05 | — | 9.4 |
| 0.20 g (0.42) | Mass A | 84.8 | — | — | — | — | 15.2 | — |
|  | Mass B | — | 33.1 | — | 58.5 | — | — | 8.4 |
| 0.27 g (0.57) | Mass A | 87.7 | — | — | — | — | 12.3 | — |
|  | Mass B | — | 32.1 | — | 59.1 | 0.2 | — | 8.7 |
| 0.93 g (1.95) | Mass A | 95.8 | — | — | — | — | 4.2 | — |
|  | Powder B | — | 26.5 | — | 54.5 | 2.8 | — | 16.2 |
| 1.22 g (2.55) | Mass A | 95.9 | — | — | — | — | 4.1 | — |
|  | Powder B | — | 22.4 | — | 65.7 | 0.1 | — | 11.7 |

(Unit: mass %, —: below the detection limit)

Example 2

In the same manner as in Example 1, 5.00 g of the oxidation-treated used Dy diffusion source was mixed with 0.27 g of boron oxide, placed in a carbon crucible (made of black lead) having a dimension of 35 mm in outer diameter× 15 mm in height×5 mm in thickness, and then subjected to a heat treatment in an industrial argon gas atmosphere at 1350° C. for 1 hour. Subsequently, the carbon crucible was furnace-cooled to room temperature. As a result, in the crucible, a mass A containing iron as a main component and a mass B containing rare earth elements as main components were present independently of but in close contact with each other and fixed to the crucible, and it turned out that Dy, which is a heavy rare earth element, and also Nd and Pr, which are light rare earth elements, had been separated in the form of oxides from iron.

Example 3

In the same manner as in Example 1, 5.00 g of the oxidation-treated used Dy diffusion source was mixed with 0.27 g of boron oxide, placed in a carbon crucible (made of black lead) having a dimension of 35 mm in outer diameter× 15 mm in height×5 mm in thickness, and then subjected to a heat treatment in an industrial argon gas atmosphere at 1650° C. for 1 hour. Subsequently, the carbon crucible was furnace-cooled to room temperature. As a result, in the crucible, a mass A containing iron as a main component and a mass B containing rare earth elements as main components were present independently of but in close contact with each other and fixed to the crucible, and it turned out that Dy, which is a heavy rare earth element, and also Nd and Pr, which are light rare earth elements, had been separated in the form of oxides from iron.

Example 4

An oxidation treatment was performed in the same manner as in Example 3, followed by a heat treatment, except that the workpiece was a Dy diffusion source prepared in accordance with the method described in Patent Document 1 for diffusing Dy as a heavy rare earth element into an R—Fe—B based permanent magnet (an alloy piece made of DyFe$_3$, the weight ratio being approximately Dy:Fe=49:51), which had been used for a predetermined period of time at a temperature range of 850° C. to 1000° C. in accordance with the method described in Patent Document 1 (an used Dy diffusion source, granular form having a particle size of 2 mm or less). Subsequently, the carbon crucible was furnace-cooled to room temperature. As a result, in the crucible, a mass A containing iron as a main component and a mass B containing rare earth elements as main components were present independently of but in close contact with each other and fixed to the crucible, and it turned out that Dy, which is a heavy rare earth element, and also Nd and Pr, which are light rare earth elements, had been separated in the form of oxides from iron.

Example 5

30.0 g of a Dy diffusion source prepared in accordance with the method described in Patent Document 1 for diffusing Dy as a heavy rare earth element into an R—Fe—B based permanent magnet (an alloy piece made of $DyFe_2$, the weight ratio being approximately Dy:Fe=59:41), which had been used for a predetermined period of time at a temperature range of 850° C. to 1000° C. in accordance with the method described in Patent Document 1 (an used Dy diffusion source, adjusted to a particle size of 300 μm or less), was subjected as a workpiece to an oxidation treatment in the same manner as in Example 1. The workpiece was then mixed with 4.2 g of carbon black (furnace black manufactured by Tokai Carbon Co., Ltd., the same hereinafter) or with 4.2 g of carbon black and 1.32 g of boron oxide. Each mixture was placed in a carbon crucible (made of black lead) having a dimension of 70 mm in outer diameter×60 mm in height×10 mm in thickness, and then subjected to a heat treatment in an industrial argon gas atmosphere at 1050° C. for 12 hours. Subsequently, the carbon crucible was furnace-cooled to room temperature. As a result, in each crucible, a simple mass made of coarse particles joined together (a brittle product that would break with slight force) was present on the entire bottom surface of the crucible without fixing. FIG. 2 (cross-sectional SEM images) and Table 3 show the results of SEM-EDX analysis of a cross-section of the individual particle forming the simple mass recovered from each crucible. As is clear from FIG. 2 and Table 3, it turned out that the individual particles forming each mass have a two phase structure consisting of a phase A and a phase B, and that the phase A contains iron as a main component, while the phase B contains rare earth elements as main components. The individual particles forming each mass were ground using a commercially available grinding machine, and then a powder of the phase A containing iron as a main component and having a size of about 5 μm was separated by a magnetic method, whereby a powder of the phase B containing rare earth elements as main components and having a size of about 1 μm was recovered (it was shown that the recovery is possible regardless of whether boron oxide is added or not).

TABLE 3

| Amount of Boron Oxide Added (Molar Ratio) | | Fe | Nd | Dy | Co | C | O |
|---|---|---|---|---|---|---|---|
| 0 g (—) | Phase A | 91.2 | — | — | 3.2 | 5.6 | — |
| | Phase B | — | 17.7 | 69.5 | — | — | 12.8 |
| 1.32 g (0.46) | Phase A | 91.4 | — | — | 4.1 | 4.5 | — |
| | Phase B | — | 25.4 | 63.3 | — | — | 11.3 |

(Unit: mass %, —: below the detection limit)

Example 6

A heat treatment was performed in the same manner as in Example 1, except that boron oxide was not mixed with 5.00 g of the oxidation-treated used Dy diffusion source. Subsequently, the carbon crucible was furnace-cooled to room temperature. As a result, in the crucible, a simple mass made of coarse particles joined together was present on the entire bottom surface of the crucible without fixing. Like the individual particles forming the simple masses recovered from each crucible in Example 5, the individual particles forming the simple mass recovered from the crucible had a two phase structure consisting of a phase A containing iron as a main component and a phase B containing rare earth elements as main components, and a powder of the phase B containing rare earth elements as main components was recovered by the grinding operation using a commercially available grinding machine and the separation operation by a magnetic method.

Second Method of the Present Invention

Example 7

The following experiment was performed using, as a workpiece, a Dy diffusion source prepared in accordance with the method described in Patent Document 1 for diffusing Dy as a heavy rare earth element into an R—Fe—B based permanent magnet (an alloy piece made of $DyFe_2$, the weight ratio being approximately Dy:Fe=59:41), which had been used for a predetermined period of time at a temperature range of 850° C. to 1000° C. in accordance with the method described in Patent Document 1 (an used Dy diffusion source, granular form having a particle size of 2 mm or less). Table 4 shows the results of ICP analysis of the used Dy diffusion source (apparatus used: ICPV-1017 manufactured by Shimadzu Corporation, the same hereinafter).

TABLE 4

| Fe | Nd | Pr | Dy | B | Others |
|---|---|---|---|---|---|
| 39.7 | 19.4 | 0.07 | 34.7 | 0.24 | 5.89 |

(Unit: mass %)

Magnet processing waste having a particle size of about 10 μm produced during the R—Fe—B based permanent magnet production process (stored in water for seven days to prevent spontaneous ignition) was dehydrated by suction filtration, and then fire was set in ambient atmosphere to burn the waste, thereby performing an oxidation treatment. Table 5 shows the results of ICP analysis of the magnet processing waste thus oxidation-treated.

TABLE 5

| Fe | Nd | Pr | Dy | B | Others |
|---|---|---|---|---|---|
| 49.2 | 16.4 | 4.1 | 2.9 | 0.76 | 26.64 |

(Unit: mass %)

Next, each amount of the used Dy diffusion sources was mixed with 5.00 g of the oxidation-treated magnet processing waste, placed in a carbon crucible (made of black lead) having a dimension of 35 mm in outer diameter×15 mm in height×5 mm in thickness, and then subjected to a heat treatment in an industrial argon gas atmosphere (oxygen content: 0.2 ppm, flow rate: 5 L/min, the same hereinafter) at 1450° C. for 1 hour. Subsequently, the carbon crucible was furnace-cooled to room temperature. FIG. 3 shows the inside of each carbon crucible furnace-cooled to room temperature after the heat treatment. As is clear from FIG. 3, in the crucible, two kinds of masses A and B were present independently of but in close contact with each other and fixed to the crucible. Table 6 shows the results of SEM-EDX analysis of the mass A and the mass B (apparatus used: 54500 manufactured by Hitachi High-Technologies Corporation, the same hereinafter) (in the table, "Degree of Oxidation" of the oxidation-treated magnet processing waste means the molar ratio of the amount of oxygen contained in the oxidation-treated magnet processing waste to the total amounts of rare earth elements contained in the used Dy diffusion source and rare earth elements contained in the oxidation-treated magnet processing waste (rare earth elements: Dy, which is a heavy rare earth element, and Nd and Pr, which are light rare earth elements), and "Addition Molar Ratio" means the molar ratio in terms of the amount of boron contained in the oxidation-treated magnet processing waste to rare earth elements contained in the used Dy diffusion source, the same hereinafter). As is clear from Table 6, it turned out that the main component of the mass A was iron, while the main components of the mass B were rare earth elements, and that Dy, which is a heavy rare earth element, and also Nd and Pr, which are light rare earth elements, had been separated in the form of oxides from iron (to make sure, X-ray diffraction analysis was separately performed using a standard sample to confirm that these rare earth elements were oxides). In addition, boron was contained in the mass B (based on ICP analysis performed separately). Incidentally, in the case where 0.25 g of the used Dy diffusion source was subjected to the above heat treatment without mixing with the oxidation-treated magnet processing waste, when the carbon crucible was furnace-cooled to room temperature after the heat treatment, only a single powder was present in the crucible. Thus, Dy, which is a heavy rare earth element, and also Nd and Pr, which are light rare earth elements, were not separated in the form of oxides from iron.

treated magnet processing waste, placed in a carbon crucible (made of black lead) having a dimension of 35 mm in outer diameter×15 mm in height×5 mm in thickness, and then subjected to a heat treatment in an industrial argon gas atmosphere at 1350° C. for 1 hour. Subsequently, the carbon crucible was furnace-cooled to room temperature. As a result, in the crucible, a mass A containing iron as a main component and a mass B containing rare earth elements as main components were present independently of but in close contact with each other and fixed to the crucible, and it turned out that Dy, which is a heavy rare earth element, and also Nd and Pr, which are light rare earth elements, had been separated in the form of oxides from iron.

Example 9

In the same manner as in Example 7, 0.25 g of the used Dy diffusion source was mixed with 5.00 g of the oxidation-treated magnet processing waste, placed in a carbon crucible (made of black lead) having a dimension of 35 mm in outer diameter×15 mm in height×5 mm in thickness, and then subjected to a heat treatment in an industrial argon gas atmosphere at 1650° C. for 1 hour. Subsequently, the carbon crucible was furnace-cooled to room temperature. As a result, in the crucible, a mass A containing iron as a main component and a mass B containing rare earth elements as main components were present independently of but in close contact with each other and fixed to the crucible, and it turned out that Dy, which is a heavy rare earth element, and also Nd and Pr, which are light rare earth elements, had been separated in the form of oxides from iron.

Example 10

A heat treatment was performed in the same manner as in Example 9, except that the workpiece was a Dy diffusion source prepared in accordance with the method described in Patent Document 1 for diffusing Dy as a heavy rare earth element into an R—Fe—B based permanent magnet (an alloy piece made of $DyFe_3$, the weight ratio being approximately Dy:Fe=49:51), which had been used for a predetermined period of time at a temperature range of 850° C. to 1000° C. in accordance with the method described in Patent Document 1 (an used Dy diffusion source, granular form having a particle size of 2 mm or less). Subsequently, the carbon crucible was furnace-cooled to room temperature. As a result, in the crucible, a mass A containing iron as a main component and a mass B containing rare earth elements as main components were present independently of but in close contact with each other and fixed to the crucible, and it

TABLE 6

| Amount of Used Dy Diffusion Source | Oxidation-Treated Magnet Processing Waste | | | Fe | Nd | Pr | Dy | Al | C | O |
|---|---|---|---|---|---|---|---|---|---|---|
| | Degree of Oxidation | Addition Molar Ratio | | | | | | | | |
| 0.10 g | 7.3 | 10.1 | Mass A | 91.4 | — | — | — | — | 8.6 | — |
| | | | Mass B | — | 58.3 | 17.5 | 14.5 | 0.4 | — | 9.3 |
| 0.17 g | 7.1 | 6.0 | Mass A | 90.6 | — | — | — | — | 9.4 | — |
| | | | Mass B | — | 58.2 | 16.3 | 14.8 | 0.4 | — | 10.3 |
| 0.25 g | 6.8 | 4.0 | Mass A | 88.1 | — | — | — | — | 11.9 | — |
| | | | Mass B | — | 56.8 | 16.5 | 15.3 | 0.4 | — | 11.0 |

(Unit: mass %, —: below the detection limit)

Example 8

In the same manner as in Example 7, 0.25 g of the used Dy diffusion source was mixed with 5.00 g of the oxidation-turned out that Dy, which is a heavy rare earth element, and also Nd and Pr, which are light rare earth elements, had been separated in the form of oxides from iron.

Example 11

A heat treatment was performed in the same manner as in Example 9, except that the used Dy diffusion source described in Example 7 was subjected to a heat treatment in ambient atmosphere at 900° C. for 5 hours, thereby performing an oxidation treatment, and an oxidation-treated used Dy diffusion source thus obtained was used as a workpiece. Subsequently, the carbon crucible was furnace-cooled to room temperature. As a result, in the crucible, a mass A containing iron as a main component and a mass B containing rare earth elements as main components were present independently of but in close contact with each other and fixed to the crucible, and it turned out that Dy, which is a heavy rare earth element, and also Nd and Pr, which are light rare earth elements, had been separated in the form of oxides from iron.

Example 12

3.00 g of a Dy diffusion source prepared in accordance with the method described in Patent Document 1 for diffusing Dy as a heavy rare earth element into an R—Fe—B based permanent magnet (an alloy piece made of $DyFe_2$, the weight ratio being approximately Dy:Fe=59:41), which had been used for a predetermined period of time at a temperature range of 850° C. to 1000° C. in accordance with the method described in Patent Document 1 (an used Dy diffusion source, adjusted to a particle size of 300 μm or less), was mixed as a workpiece with 30.0 g of the oxidation-treated magnet processing waste described in Example 7 and 4.1 g of carbon black (furnace black manufactured by Tokai Carbon Co., Ltd.), placed in a carbon crucible (made of black lead) having a dimension of 70 mm in outer diameter× 60 mm in height×10 mm in thickness, and then subjected to a heat treatment in an industrial argon gas atmosphere at 1050° C. for 12 hours. Subsequently, the carbon crucible was furnace-cooled to room temperature. As a result, in the crucible, a simple mass made of coarse particles joined together (a brittle product that would break with slight force) was present on the entire bottom surface of the crucible without fixing. FIG. 4 (cross-sectional SEM image) and Table 7 show the results of SEM-EDX analysis of a cross-section of the individual particle forming the simple mass recovered from the crucible. As is clear from FIG. 4 and Table 7, it turned out that the individual particle forming the mass have a two phase structure consisting of a phase A and a phase B, and that the phase A contains iron as a main component, while the phase B contains rare earth elements as main components. The individual particles forming the mass were ground using a commercially available grinding machine, and then a powder of the phase A containing iron as a main component and having a size of about 5 μm was separated by a magnetic method, whereby a powder of the phase B containing rare earth elements as main components and having a size of about 1 μm was recovered.

TABLE 7

| Amount of Used Dy Diffusion Source | Degree of Oxidation | Oxidation-Treated Magnet Processing Waste Addition Molar Ratio | | Fe | Nd | Dy | Co | C | O |
|---|---|---|---|---|---|---|---|---|---|
| 3.00 g | 6.5 | 2.6 | Phase A | 92.2 | — | — | 3.6 | 4.2 | — |
|  |  |  | Phase B | — | 11.9 | 76.7 | — | — | 11.4 |

(Unit: mass %, —: below the detection limit)

INDUSTRIAL APPLICABILITY

According to the present invention, a method for recovering a heavy rare earth element from a workpiece containing at least a heavy rare earth element and an iron group element, which can be put into practical use as a low-cost, simple recycling system, can be provided. In this respect, the present invention is industrially applicable.

The invention claimed is:

1. A method for recovering a heavy rare earth element from a workpiece containing at least a heavy rare earth element and an iron group element, characterized by including at least the following step: a workpiece is subjected to an oxidation treatment such that as a result of the oxidation treatment the molar ratio of oxygen to the heavy rare earth element in the workpiece becomes 2.0 times or more, and then subjected to a heat treatment in the presence of carbon at a temperature of 1000° C. or more, thereby separating a heavy rare earth element in the form of an oxide from an iron group element.

2. A method according to claim 1, characterized in that the heat treatment temperature is 1300° C. or more.

3. A method according to claim 2, characterized in that the heat treatment of the oxidation-treated workpiece is performed using a carbon crucible as a treatment container and also as a carbon supply source.

4. A method according to claim 2, characterized in that the heat treatment of the oxidation-treated workpiece is performed in the presence of carbon and boron.

5. A method according to claim 4, characterized in that the heat treatment of the oxidation-treated workpiece is performed using boron oxide as a boron supply source.

6. A method according to claim 2, characterized in that at least part of the workpiece is in granular or powder form having a particle size of 5 mm or less.

7. A method according to claim 2, characterized in that the workpiece has an iron group element content of 30 mass % or more.

8. A method according to claim 2, characterized in that the workpiece is a heavy rare earth element diffusion source made of an alloy of a heavy rare earth element and iron for diffusing a heavy rare earth element into an R—Fe—B based permanent magnet, the heavy rare earth element diffusion source having been used and thus further containing a component derived from the magnet.

* * * * *